US009612920B2

(12) United States Patent
Sygulla et al.

(10) Patent No.: US 9,612,920 B2
(45) Date of Patent: Apr. 4, 2017

(54) HIERARCHICAL SYSTEM MANAGER ROLLBACK

(71) Applicant: Silicon Graphics International Corp., Milpitas, CA (US)

(72) Inventors: John Michael Sygulla, Chippewa Falls, WI (US); Arun Ramakrishnan, TamilNadu (IN); Greg Slowiak, Chippewa Falls, WI (US)

(73) Assignee: Silicon Graphics International Corp., Milpitas, CA (US)

( * ) Notice: Subject to any disclaimer, the term of this patent is extended or adjusted under 35 U.S.C. 154(b) by 679 days.

(21) Appl. No.: 13/831,771

(22) Filed: Mar. 15, 2013

(65) Prior Publication Data

US 2014/0279919 A1    Sep. 18, 2014

(51) Int. Cl.
*G06F 17/30* (2006.01)
*G06F 11/14* (2006.01)

(52) U.S. Cl.
CPC ...... *G06F 11/1469* (2013.01); *G06F 11/1451* (2013.01)

(58) Field of Classification Search
CPC ............ G06F 11/1469; G06F 11/1451; G06F 11/1458; G06F 11/2082; G06F 2201/84; G06F 11/1435; G06F 2201/86; G06F 11/1448; G06F 11/1471; G06F 11/1438; G06F 17/3023; G06F 11/1446; G06F 11/2069; H04L 41/085; Y10S 707/99953; Y10S 707/99954
USPC .................................. 707/649, 639, 674, 684
See application file for complete search history.

(56) References Cited

U.S. PATENT DOCUMENTS

| 1,853,428 A | 4/1932 | Jackson |
| 3,184,645 A | 5/1965 | Schaeffer |
| 4,447,856 A | 5/1984 | Takahashi et al. |
| 4,644,443 A | 2/1987 | Swensen et al. |
| 4,672,509 A | 6/1987 | Speraw |
| 4,691,274 A | 9/1987 | Barrus |
| 4,702,154 A | 10/1987 | Dodson |

(Continued)

FOREIGN PATENT DOCUMENTS

| DE | 3316978 A1 | 11/1984 |
| FR | 2610471 A1 | 8/1988 |
| GB | 2124432 A | 2/1984 |

OTHER PUBLICATIONS

US 6,491,274, 09/1987, Matouk et al. (withdrawn).

(Continued)

*Primary Examiner* — Evan Aspinwall
(74) *Attorney, Agent, or Firm* — Polsinelli LLP

(57) ABSTRACT

Data state rollover is performed based on data state snapshots and deltas. A series of snapshots is taken of the current data state, an original data state, and data states in between. Deltas are then generated between two sequential snapshots. This results in numerous deltas which represent the difference between consecutive snapshots. Once the deltas are acquired, the deltas may be stored along with the snapshot of the present data state. As such, previous data states may be rolled back to by determining the number of deltas to apply to the current data state to achieve the desired previous data state. In cases where the rollback or rollover fails, deltas may be played against the current data state to a point where the last known trusted and working data point existed.

20 Claims, 5 Drawing Sheets

(56) References Cited

U.S. PATENT DOCUMENTS

| | | |
|---|---|---|
| 4,728,160 A | 3/1988 | Mondor et al. |
| 4,754,397 A | 6/1988 | Ferchau |
| 4,774,631 A | 9/1988 | Okuyama et al. |
| 4,860,163 A | 8/1989 | Sarath |
| 4,901,200 A | 2/1990 | Mazura |
| 4,911,231 A | 3/1990 | Horne |
| 4,977,532 A | 12/1990 | Borkowicz |
| 5,031,075 A | 7/1991 | Casanova et al. |
| D319,225 S | 8/1991 | Kline et al. |
| 5,038,308 A | 8/1991 | Le et al. |
| 5,069,274 A | 12/1991 | Haslett et al. |
| 5,101,320 A | 3/1992 | Bhargava et al. |
| 5,107,398 A | 4/1992 | Bailey |
| 5,136,464 A | 8/1992 | Ohmori |
| 5,216,579 A | 6/1993 | Basara et al. |
| 5,227,957 A | 7/1993 | Deters |
| D350,333 S | 9/1994 | Sharp |
| 5,351,176 A | 9/1994 | Oliver |
| 5,398,159 A | 3/1995 | Andersson et al. |
| 5,398,161 A | 3/1995 | Roy |
| 5,410,448 A | 4/1995 | Barker, III et al. |
| 5,412,534 A | 5/1995 | Cutts et al. |
| 5,432,674 A | 7/1995 | Hardt |
| 5,440,450 A | 8/1995 | Lau et al. |
| 5,450,285 A | 9/1995 | Schlemmer |
| 5,460,441 A | 10/1995 | Hastings et al. |
| 5,466,059 A | 11/1995 | Liu |
| 5,497,288 A | 3/1996 | Otis et al. |
| 5,505,533 A | 4/1996 | Kammersqard et al. |
| 5,515,239 A | 5/1996 | Kamerman et al. |
| 5,528,454 A | 6/1996 | Niklos |
| 5,544,012 A | 8/1996 | Koike |
| 5,571,256 A | 11/1996 | Good et al. |
| 5,587,877 A | 12/1996 | Ryan et al. |
| 5,596,483 A | 1/1997 | Wylar |
| 5,602,721 A | 2/1997 | Slade et al. |
| 5,646,823 A | 7/1997 | Amori |
| 5,684,671 A | 11/1997 | Blewett |
| 5,684,674 A | 11/1997 | Yin |
| 5,691,883 A | 11/1997 | Nelson |
| 5,726,866 A | 3/1998 | Allen |
| 5,751,549 A | 5/1998 | Eberhardt et al. |
| 5,788,347 A | 8/1998 | Rabinovitz |
| 5,793,608 A | 8/1998 | Winick et al. |
| 5,793,610 A | 8/1998 | Schmitt et al. |
| 5,793,616 A | 8/1998 | Aubuchon et al. |
| 5,796,580 A | 8/1998 | Komatsu et al. |
| 5,800,258 A | 9/1998 | Knoop |
| 5,808,871 A | 9/1998 | Rosecan et al. |
| 5,813,243 A | 9/1998 | Johnson et al. |
| 5,822,182 A | 10/1998 | Scholder et al. |
| 5,875,965 A | 3/1999 | Lee |
| 5,896,273 A | 4/1999 | Varghese et al. |
| 5,909,357 A | 6/1999 | Orr |
| 5,935,227 A | 8/1999 | Phan |
| 5,947,570 A | 9/1999 | Anderson et al. |
| 5,949,646 A | 9/1999 | Eberhardt et al. |
| 5,956,227 A | 9/1999 | Kitaoka |
| D415,738 S | 10/1999 | Ito et al. |
| 5,971,506 A | 10/1999 | Dubin |
| 5,992,953 A | 11/1999 | Rabinovitz |
| 5,999,365 A | 12/1999 | Hasegawa |
| 6,000,464 A | 12/1999 | Scafidi et al. |
| 6,018,456 A | 1/2000 | Young et al. |
| 6,018,458 A | 1/2000 | Delia et al. |
| 6,024,165 A | 2/2000 | Melane et al. |
| 6,025,989 A | 2/2000 | Ayd |
| 6,034,868 A | 3/2000 | Paul |
| 6,052,276 A | 4/2000 | Do et al. |
| 6,058,009 A | 5/2000 | Hood, III |
| 6,078,503 A | 6/2000 | Gallagher et al. |
| 6,081,425 A | 6/2000 | Cheng |
| 6,088,224 A | 7/2000 | Gallagher et al. |
| 6,098,131 A | 8/2000 | Unger et al. |
| 6,106,687 A | 8/2000 | Edelstein |
| 6,114,622 A | 9/2000 | Draeger |
| 6,115,250 A | 9/2000 | Schmitt |
| 6,129,429 A | 10/2000 | Allen |
| 6,134,107 A | 10/2000 | Buller et al. |
| 6,134,667 A | 10/2000 | Suzuki et al. |
| 6,141,213 A | 10/2000 | Antonuccio et al. |
| 6,147,862 A | 11/2000 | Ho |
| 6,163,454 A | 12/2000 | Strickler |
| 6,185,098 B1 | 2/2001 | Benavides |
| 6,195,262 B1 | 2/2001 | Bodette et al. |
| 6,195,493 B1 | 2/2001 | Bridges |
| 6,208,522 B1 | 3/2001 | Manweiller et al. |
| 6,255,583 B1 | 7/2001 | Johnson et al. |
| 6,259,605 B1 | 7/2001 | Schmitt |
| 6,304,443 B1 | 10/2001 | Chou |
| 6,305,180 B1 | 10/2001 | Miller et al. |
| 6,313,988 B1 | 11/2001 | Pham |
| 6,356,435 B1 | 3/2002 | Davis |
| 6,412,292 B2 | 7/2002 | Spinazzola et al. |
| 6,437,980 B1 | 8/2002 | Casebolt |
| 6,494,050 B2 | 12/2002 | Spinazzola et al. |
| 6,496,366 B1 | 12/2002 | Coglitore et al. |
| 6,504,717 B1 | 1/2003 | Heard |
| 6,504,718 B2 | 1/2003 | Wu |
| 6,506,111 B2 | 1/2003 | Sharp et al. |
| 6,523,918 B1 | 2/2003 | Baiza |
| 6,525,935 B2 | 2/2003 | Casebolt |
| 6,535,382 B2 | 3/2003 | Bishop et al. |
| 6,557,357 B2 | 5/2003 | Spinazzola et al. |
| D475,705 S | 6/2003 | Coglitore et al. |
| 6,574,104 B2 | 6/2003 | Patel et al. |
| 6,616,524 B2 | 9/2003 | Storck, Jr. et al. |
| 6,639,794 B2 | 10/2003 | Olarig et al. |
| 6,643,123 B2 | 11/2003 | Hartel et al. |
| 6,650,535 B1 | 11/2003 | Moss |
| 6,667,891 B2 | 12/2003 | Coglitore et al. |
| 6,741,467 B2 | 5/2004 | Coglitore et al. |
| 6,795,314 B1 | 9/2004 | Arbogast |
| 6,819,563 B1 | 11/2004 | Chu et al. |
| 6,822,859 B2 | 11/2004 | Coglitore et al. |
| 6,829,141 B2 | 12/2004 | Garnett |
| 6,840,304 B1 | 1/2005 | Kobayashi et al. |
| 6,847,524 B2 | 1/2005 | Tomioka |
| 6,848,989 B2 | 2/2005 | Miyazaki et al. |
| 6,850,408 B1 | 2/2005 | Coglitore et al. |
| 6,867,966 B2 | 3/2005 | Smith et al. |
| 6,867,967 B2 | 3/2005 | Mok |
| 6,876,164 B2 | 4/2005 | Liu |
| 6,878,874 B2 | 4/2005 | Osborn |
| 6,927,980 B2 | 8/2005 | Fukuda et al. |
| 7,068,509 B2 | 6/2006 | Bash et al. |
| 7,108,051 B2 | 9/2006 | Hung |
| 7,123,477 B2 | 10/2006 | Coglitore et al. |
| 7,173,821 B2 | 2/2007 | Coglitore |
| 7,209,352 B2 | 4/2007 | Chen |
| 7,236,370 B2 | 6/2007 | Coglitore |
| 7,286,345 B2 | 10/2007 | Casebolt |
| 7,369,406 B2 | 5/2008 | Matsushima |
| 7,397,662 B2 | 7/2008 | Oyamada |
| 7,436,663 B2 | 10/2008 | Matsushima |
| 7,499,273 B2 | 3/2009 | Casebolt |
| 7,500,911 B2 | 3/2009 | Johnson et al. |
| 7,508,663 B2 | 3/2009 | Coglitore |
| 7,535,707 B2 | 5/2009 | Seibold |
| 7,650,533 B1 * | 1/2010 | Saxena ............... G06F 11/1451 |
| | | 714/13 |
| 7,719,837 B2 | 5/2010 | Wu et al. |
| 7,768,780 B2 | 8/2010 | Coglitore |
| 8,787,014 B2 | 7/2014 | Zhang |
| 9,426,932 B2 | 8/2016 | Kinstle |
| 2002/0075656 A1 | 6/2002 | Hastings et al. |
| 2002/0126449 A1 | 9/2002 | Casebolt |
| 2002/0173266 A1 | 11/2002 | Sharp et al. |
| 2002/0173267 A1 | 11/2002 | Sharp et al. |
| 2003/0035268 A1 | 2/2003 | Coglitore et al. |
| 2003/0133266 A1 | 7/2003 | Behl |
| 2003/0198018 A1 | 10/2003 | Cipolla et al. |
| 2004/0004813 A1 | 1/2004 | Coglitore et al. |
| 2004/0070936 A1 | 4/2004 | Coglitore et al. |

(56) References Cited

U.S. PATENT DOCUMENTS

| | | |
|---|---|---|
| 2004/0085727 A1 | 5/2004 | Kim |
| 2004/0114323 A1 | 6/2004 | Mok |
| 2004/0228087 A1 | 11/2004 | Coglitore |
| 2005/0030711 A1 | 2/2005 | Tsai |
| 2005/0047098 A1 | 3/2005 | Garnett et al. |
| 2005/0068716 A1 | 3/2005 | Pereira |
| 2005/0103480 A1 | 5/2005 | Pokharna et al. |
| 2005/0168938 A1 | 8/2005 | Bash |
| 2005/0168945 A1 | 8/2005 | Coglitore |
| 2005/0170770 A1 | 8/2005 | Johnson et al. |
| 2005/0218869 A1 | 10/2005 | Casebolt |
| 2008/0024988 A1 | 1/2008 | Suzuki et al. |
| 2009/0116183 A1 | 5/2009 | Mundt |
| 2010/0124012 A1 | 5/2010 | Kondo et al. |
| 2010/0161558 A1* | 6/2010 | Goldberg ............... G06Q 10/06 707/639 |
| 2011/0078657 A1* | 3/2011 | Okada ................. G06F 11/1438 717/116 |
| 2011/0100608 A1 | 5/2011 | Huang et al. |
| 2011/0203777 A1 | 8/2011 | Zhao et al. |
| 2011/0247348 A1 | 10/2011 | Mashiko et al. |
| 2013/0085999 A1* | 4/2013 | Tung ................... G06F 11/1451 707/654 |
| 2013/0110961 A1* | 5/2013 | Jadhav .................. G06F 15/167 709/213 |
| 2013/0141863 A1 | 6/2013 | Ross et al. |
| 2013/0147503 A1 | 6/2013 | Kamath et al. |
| 2013/0168050 A1 | 7/2013 | Chauhan et al. |
| 2014/0085808 A1 | 3/2014 | Tung et al. |
| 2014/0268550 A1 | 9/2014 | Kinstle |
| 2014/0268551 A1 | 9/2014 | Van Pelt |
| 2014/0268552 A1 | 9/2014 | Provenzale |
| 2014/0268553 A1 | 9/2014 | Van Pelt |

OTHER PUBLICATIONS

3Com Corporation. "NETBuilder II 3C6023 Token Ring Module," located at <http://www.all3com.com/cart/3c6023.html> last visited on May 9, 2003 (1 page).

3Com Corporation. "NETBuilder II 4-Slot Chassis," located at <http://www.all3com.com/cart/3c6000.html> last visited on May 9, 2003 (1 page).

3Com Corporation. "NETBuilder II 8-Slot Chassis," located at <http://www.all3com.com/cart/3c6001.html> last visited on May 9, 2003 (1 page).

3Com Corporation. "NETBuilder II CEC 12 Meg. Module PWA," located at <http://www.all3com.com/cart/3c6010.html> last visited on May 9, 2003 (1 page).

3Com Corporation. "NETBuilder II CEC 12 Meg. Module PWA," located at <http://www.all3com.com/cart/3c6010a.html> last visited on May 9, 2003 (1 page).

3Com Corporation. "NETBuilder II CEC 8MB Memory Expansion," located at <http://www.all3com.com/cart/3c6011.html> last visited on May 9, 2003 (1 page).

3Com Corporation. "NETBuilder II CEC-Star 20MB Module," located at <http://www.all3com.com/cart/3c6012html> last visited on May 9, 2003 (1 page).

3Com Corporation. "NETBuilder II CEC-Star 20 MB Module," located at <http://www.all3com.com/cart/3c6012a.html> last visited on May 9, 2003 (1 page).

3Com Corporation. "NETBuilder II DPE PLUS 80MB Module," located at <http://www.all3com.com/cart/3c6091a.html> last visited on May 9, 2003 (1 page).

3Com Corporation. "NETBuilder II Dual-Processor Engine 40 MB Module," located at <http://www.all3com.com/cart/3c6090.html> last visited on May 9, 2003 (1 page).

3Com Corporation. "NETBuilder II Dual-Processor Engine plus Module," located at <http://www.all3com.com/cart/3c6091.html> last visited on May 9, 2003 (1 page).

3Com Corporation. "NETBuilder II Ethernet Module, AUI or BNC," located at <http://www.all3com.com/cart/3c6021.html> last visited on May 9, 2003 (1 page).

3Com Corporation. "NETBuilder II Ethernet with AUI Module, No BNC," located at <http://www.all3com.com/cart/3c6062.html> visited on May 9, 2003 (1 page).

3Com Corporation. "NETBuilder II Fast Ethernet 100Base-FX Module—Fiber," located at <http://www.all3com.com/cart/3c6071.html> visited on May 9, 2003 (1 page).

3Com Corporation. "NETBuilder II Fast Ethernet 100Base-TX Module—RJ-45," located at <http://www.all3com.com/cart/3c6070.html> visited on May 9, 2003 (1 page).

3Com Corporation. "NETBuilder II FDDI SingleMode Module," located at <http://www.all3com.com/cart/3c6050a.html> visited on May 9, 2003 (1 page).

3Com Corporation. "NETBuilder II FDDILink Module—Multimode-multimode," located at <http://www.all3com.com/cart/3c6055.html> visited on May 9, 2003 (1 page).

3Com Corporation. "NETBuilder II Flash for 8 Slot Extended Chassis," located at <http://www.all3com.com/cart/3c6082a.html> visited on May 9, 2003 (1 page).

3Com Corporation. "NETBuilder II HSS 3-Port RS-449 Module," located at <http://www.all3com.com/cart/3c6042.html> visited on May 9, 2003 (1 page).

3Com Corporation. "NETBuilder II HSS 4 Port WAN Module," located at <http://www.all3com.com/cart/3c6047.html> visited on May 9, 2003 (1 page).

3Com Corporation. "NETBuilder II HSS 4 Port WAN Module," located at <http://www.all3com.com/cart/3c6047a.html> vistied on May 9, 2003 (1 page).

3Com Corporation. "NETBuilder II HSS 8 Port BRI U Module," located at <http://www.all3com.com/cart/3c6045.html> visited on May 9, 2003 (1 page).

3Com Corporation. "NETBuilder II HSS G.703 Module," located at <http://www.all3com.com/cart/3c6025.html> visited on May 9, 2003 (1 page).

3Com Corporation. "NETBuilder II HSS RS-232 3 Port Module," located at <http://www.all3com.com/cart/3c6041a.html> vsted on May 9, 2003 (1 page).

3Com Corporation. "NETBuilder II HSS RS-449 Module," located at <http://www.all3com.com/cart/3c6024.html> visited on May 9, 2003 (1 page).

3Com Corporation. "NETBuilder II HSS V.35 3 Port Module," located at <http://www.all3com.com/cart/3c6040.html> visited on May 9, 2003 (1 page).

3Com Corporation. "NETBuilder II HSSI Module—OC-1<SUB>-</SUB>T3-E3 and subrates," located at <http://www.all3com.com/cart/3c6028.html> visited on May 9, 2003 (1 page).

3Com Corporation. "NETBuilder II HSS-V.35.RS-232 Module," located at <http://www.all3com.com/cart/3c6022a.html> visited on May 9, 2003 (1 page).

3Com Corporation. "NETBuilder II MP ATMLink OC-3 Multimode Module," located at <http://www.all3com.com/cart/3c6075.html> visited on May 9, 2003 (1 page).

3Com Corporation. "NETBuilder II MP Ethernet 6 Port 10Base-FL Module," located at <http://www.all3com.com/cart/3c6061.html> visited on May 9, 2003 (1 page).

3Com Corporation. "NETBuilder II MP Ethernet 6 Port 10Base-T Module," located at <http://www.all3com.com/cart/3c6060.html> visited on May 9, 2003 (1 page).

3Com Corporation. "NETBuilder II MultiMode FDDI module set," located at <http://www.all3com.com/cart/3c6020.html> visited on May 9, 2003 (1 page).

3Com Corporation. "NETBuilder II MultiMode FDDI module set," located at <http://www.all3com.com/cart/3c6020b.html> visited on May 9, 2003 (1 page).

3Com Corporation. "NETBuilder II PWA Flash Floppy Board for NetBuilder II 3C6081A," located at <http://www.all3com.com/cart/3c6027a.html> visited on May 9, 2003 (1 page).

3Com Corporation. "NETBuilder II HSS 8 Port BRI ST Module," located at <http://www.all3com.com/cart/3c6046.html> visited on May 9, 2003 (1 page).

(56) References Cited

OTHER PUBLICATIONS

3Com Corporation. "NETBuilder II V.35.RS-232 HSS Module," located at <http://www.all3com.com/cart/3c6022.html> visited on May 9, 2003 (1 page).
3Com Corporation. "NEW 3Com NETBuilder II EM AU 3C6062," located at <http://cgi.ebay.com/ws/eBayISAPI.dll?View Item &item=3045649846&category=11184> visited on Sep. 8, 2003 (1 page).
3Com Corporation. (1997). Title Unknown. Chapters 27-70, Appendices A-B, 416 pages.
3Com Corporation. (1997). Title Unknown. Chapters 31-54, Appendices A-R, 636 pages.
3Com Corporation. (Aug. 1994). "NETBuilder II(R) High-Speed Serial RS-449/X.21 3-Port Module Installation Guide", 23 pages.
3Com Corporation. (Aug. 1996). "NETBuilder II(R) HSS RS-232 3-Port DCE/DTE Module Installation Guide," 25 pages.
3Com Corporation. (Aug. 1997). "Installing the NETBuilder II(R) Dual Processor Engine Module," 33 pages.
3Com Corporation. (Date Unknown). "Discontinued Products List NetBuilder—(NETBuilder II, SSIINBSI, SSIINB, OCNB, NBRO)," 8 pages total.
3Com Corporation. (Date Unknown). "NETBuilder II Intelligent Routers," NETBuilder , 8 pages.
3Com Corporation. (Date Unknown). "DTE-to-DCE Adapter Release Notes," 2 pages.
3Com Corporation. (Date Unknown). "Installing the NETBuilder II Dual Processor Engine Module IMAGE," located at <http://www.all3com.com/cart/img/3c6090<SUB>-</SUB>zoom.jpg> visited on May 9, 2003 (2 pages).
3Com Corporation. (Date Unknown). "Installing the NETBuilder II Dual Processor Engine Module IMAGE," located at <http://www.all3com.com/cart/img/3c6091<SUB>-</SUB>zoom.jpg> visited on May 9, 2003 (2 pages).
3Com Corporation. (Dec. 1993). "NETBuilder II Dual Power Supply System Installation Guide," 26 pages.
3Com Corporation. (Dec. 1993). "NETBuilder II Dual Power Supply System Installation Guide," 61 pages.
3Com Corporation. (Dec. 1996). "NETBuilder II® Flash Memory Drive Installation Guide", 42 pages.
3Com Corporation. (Feb. 1994). "NETBuilder II® HSSI Module Installation Guide Release Notes", 35 pages.
3Com Corporation. (Jan. 1993). "NETBuilder II® High-Speed Serial V.35/RS-232 Module Installation Guide", 23 pages.
3Com Corporation. (Jan. 1994). "NETBuilder II Base System Installation Guide Release Notes", 4 pages.
3Com Corporation. (Jan. 1994). "NETBuilder II® HSSI Module Installation Guide", 28 pages.
3Com Corporation. (Jan. 1998). "Installing the NETBuilder II® HSS 4-Port WAN Module", 19 pages.
3Com Corporation. (Jan. 1998). "NETBuilder II® HSS 4-Port WAN Module Software Release Notes: Software Version 10.3", 13 pages.
3Com Corporation. (Jan. 1998). "NETBuilder II® HSS 4-Port WAN Module Software Release Notes—Software Version 10.3", 12 pages.
3Com Corporation. (Jul. 1995). "NETBuilder II® MP Ethernet 6-Port 10BASE-T and 10BASE-FL Module Installation Guide", 19 pages.
3Com Corporation. (Jun. 1995). "NETBuilder II® Fast Ethernet 100BASE-TX/100BASE-FX Module Installation Guide", 25 pages.
3Com Corporation. (Jun. 1996). "NETBuilder II(R) Communications Engine Card (CEC20) Module Installation Guide", 34 pages.
3Com Corporation. (Jun. 1996). "NETBuilder II® Communications Engine Card (CEC20) Module Installation Guide", 29 pages.
3Com Corporation. (Mar. 1992). "NETBuilder II® Ethernet Module Installation Guide", 21 pages.
3Com Corporation. (Mar. 1993). "NETBuilder II® High-Speed Serial RS-449 Module Installation Guide", 24 pages.
3Com Corporation. (Mar. 1993). "NETBuilder II(R) High Speed Serial G.703 Module Installation Guide", 19 pages.
3Com Corporation. (Mar. 1995). "NETBuilder II® CEC Memory Expansion Installation Guide", 7 pages.
3Com Corporation. (May 1997). "Approved Flash Memory and DRAM for the NETBuilder II® DPe Module", 1 page.
3Com Corporation. (May 1997). "Installing the NETBuilder II® Bridge/Router: For EZ Built Systems and Base Chassis", 81 pages.
3Com Corporation. (May 1997). "Installing the NETBuilder II® Dual Processor Engine Module: For Models DPE 40 and DPE 80", 29 pages.
3Com Corporation. (May 1997). "NETBuilder II® Hardware Installation Guides", 12 pages.
3Com Corporation. (May 2003). "Installing the NETBuilder II Bridge/Router", 45 pages.
3Com Corporation. (Oct. 1997). "New Installation for NETBuilder II® Software: Software Version 10.1.", 70 pages.
Anonymous, "Cobalt RaQ 2," located at <http://www.cobalt.com/products/pdfs/datasheet.rag2.pdf>, last visited on Nov. 27, 2000, 2 pages.
Anonymous, "Cobalt RaQ 3,"located at <http://www.cobalt.com/products/pdfs/datasheet.rag3.pdf>, last visited on Nov. 27, 2000, 2 pages.
Anonymous, "Cobalt RaQ 4,"located at <http://www.cobalt.com/products/pdfs/datasheet.rag4.pdf>, last visited on Nov. 27, 2000, 2 pages.
Anonymous, "SGI—O2 Workstation Product Overview," located at <http://www.sgi.com/02/overview.html>, last visited on Sep. 8, 2000, 4 pages.
Anonymous. "A Rack-Mountable Web Server for ISPs of All Sizes," located at http://www.sgi.com/solutions/internet/products/rackmount.html <http://www.sgi.com/solutions/internet/products/rachmoun.html>, last visited on Jan. 6, 2000, 4 pages.
Anonymous. (Mar. 10, 1988). "Silicon Graphics Unveils Dedicated, Entry-Level Hosting Solution," Press Release, located at <http://www.sgi.com/newsroom/press_releases/1998/march/o2webserver_release.html>, last visited on Jan. 6, 2000, 2 pages.
Anonymous. (Monday, Apr. 24, 2000). "Rackmount Solutions," San Jose Mercury News Business Section, 1 page.
Anderson, R.D. et al. (Feb. 1972). "Volatile Memory Data Retention," IBM Technical Disclosure Bulletinpp. 2712-2713, located <http://www.delphion.com/tdb?order=72C+00474>visited on Nov. 18, 2005 (2 pages).
Argento, C.W. et al. (Jun. 1996). "Forced Convection Air-Cooling of a Commerical Electronic Chassis: An Experimental and Computational Case Study," IEEE Transactions on Components, Packaging, and Manufacturing Technology—Part A19(2):248-257.
Artecon, Inc. (Mar. 26, 1997). "Artecon Announces Industry's Highest Performing RAID System for Small Networks; LynxArray Series 3000 Offers Fault Tolerance, True Scalability, Hot-Swap Components," Business Wire(Press Release), 2 pages.
Author Unknown. (Jul. 26, 1999). "New Products," Electronic Design, 3 pages.
Baker, D.L. et al. (Jan. 1990). "Rack-Mounted Computer System," IBM Technical Disclosure Bulletin, pp. 258-259.
Bay Networks, Inc. (Date Unknown). "Bay Networks Accelar-Supports Management Module SM-BAY 1002", SPECTRUM Enterprise Manager, Device, Management, Cabletron Systems, 71 pages.
Bay Networks, Inc. (Dec. 1997). "Using the Accelar 1200/1250 Routing Switch", 80 pages.
Bay Networks, Inc. (Dec. 1997). "Release Notes for the Accelar 1000 Series Products—Release 1.0", 18 pages.
Bay Networks, Inc. (Jun. 1998). "Release Notes for the Accelar 1000 Series Products—Software Release 1.1.1", 60 pages.
Bay Networks, Inc. (Nov. 1997). "Accelar 1200 Routing Switch", Strategic Networks, 9 pages.
Bay Networks, Inc. (Sep. 1998). "Release Notes for the Accelar 1000 Series Products—Software Release 1.3", 56 pages.
Bay Networks, Inc. (Sep. 1998). "Using the Accelar 1200/1250 Routing Switch", 94 pages.
Brown et al. (Sep. 1989). "Accessible Interconnect for Rack-Mounted Processor Module-To-Module Logic Signal Communication," IBM Technical Disclosure Bulletin, pp. 276-277.

(56) References Cited

OTHER PUBLICATIONS

Cisco Systems, Inc. (Jan. 17, 1994). "News Release: Cisco Adds Four Remote Access Routers," News Release, 29 pages.
COL Computer Online, "HP ProCurve Routing Switch 9308M," located at <http://www.gotocol.com/hp9308m.html> visited on Mar. 6, 2006. (3 pages).
David Systems, Inc. (1988). David Co-Net Technical Reference Manual David Systems, Inc.: Sunnyvale, CA, 162 pages.
David Systems, Inc. (Oct. 1984-Nov. 1986). "Selected Press Articles", David Systems, Inc.: Sunnyvale, CA, 133 pages.
Dax Systems, Inc. (Aug. 9, 1996). "Dax Systems Serves Up Rack Mount Solution for Intel Multi-processor," Business Wire(Press Release). 2 pages.
Electronic Technology Group, Inc. (Jul. 8, 1994). "ETG Announces Release of New Raidmaster Disk Array Subsystem," PR Newswire (Press Release), 2 pages.
European Telecommunication Standards Institute ed. (Jan. 1994). "Equipment Engineering (EE): European Telecommunication Standard for Equipment Practice Part 3: Engineering Requirements for Miscellaneous Racks and Cabinets," ETS 300 119-3. ETSI: Valbonne, France, pp. 1-17.
Fetters, D. (Feb. 8, 1999). "Cubix High-Density Server Leads the Way With Standout Management Software," Network Computing, pp. 84-92.
Fetters, D. (Mar. 22, 1999). "Need Some Space? Have a Server Rack Attack," Network Computing, pp. 90-91.
Grigonis, R. (Feb. 1997). Dialog.RTM. Search for "Getting Under the Hood," Computer TelephonypS10, 8 pages.
Kaiser, L. et al. (1989). "Noise Control on Computer and Business Equipment using Speed Controlled Blowers," IEEE2:114-117.
Markstein, H.W. (May 1996). "Cooling Electronic Equipment Enclosures," Electronic Packaging & Production, pp. 57-63.
Nortel Networks, Inc. (Oct. 1998). "News Release," located at <http://www.nortel.com/corporate/news/newsreleases/press.sub.--10-98.h-tml> visited on Feb. 16, 2006 (10 pages total).
Nortel Networks, Inc. (Date Unknown). "Building SAP-Capable Networks-How to Turn Your Network Into a Competitive Advantage", White Paper, pp. 1-24.
Nortel Networks, Inc. (Mar. 1999). "Release Notes for the Accelar 1000 Series Products—Software Release 2.0", 39 pages.
Nortel Networks, Inc. (Mar. 1999). "Using the Accelar 1200/1250 Routing Switch", 96 pages.
Paturet, J. (May 1989). "Improved Cooling System for Rack-Mounted Equipment," IBM Technical Disclosure Bulletin, pp. 140-141, located at <http://www.delphion.com/tdbs/tdb?order=89A+60774>visited on Nov. 22, 2005.
Perlmutter, A. (Sep. 1959). "Uniform Cooling Air Flow During Computer Maintenance and Operation," IRE Transactions on Component Parts6(3):180-189.
Rezek, G. (Mar./Jun. 1966). "Suction vs. Pressure Forced Air Cooling-Part II," IEEE Transactions on Parts, Materials and Packaging 2(1/2):35-43.
Ross, G. (Feb. 1995). "Thermal Management in Racks and Cabinets," Computer Packaging Technology pp. 82-84.
Simons, R.E. (Dec. 1995). "The Evolution of IBM High Performance Cooling Technology," IEEE Transactions on Components, Packaging, and Manufacturing Technology—Part A 18(4):805-811.
Soliman, F.A. et al. (1992). "Software-Compensated Programmable Temperature Controller," Int. J. Electronics 73(1): 101-105.
The Tolly Group ed. (Mar. 1998). "Bay Networks Accelar 1200.TM. Routing Switch", The Tolly Group, pp. 1-6.
Wong, H. et al. (Dec. 1996). "Thermal Evaluation of PowerPC 620 Microprocessor in a Multiprocessor Computer," IEEE Transactions and Components, Packaging and Manufacturing Technology—Part A 19(4):469-477.
U.S. Appl. No. 11/026,163 Final Office Action mailed Jul. 3, 2008.
U.S. Appl. No. 11/026,163 Office Action mailed Feb. 28, 2008.
U.S. Appl. No. 11/026,163 Final Office Action mailed Jan. 19, 2007.
U.S. Appl. No. 11/026,163 Office Action mailed Jul. 27, 2006.
U.S. Appl. No. 11/026,163 Final Office Action mailed Jan. 24, 2006.
U.S. Appl. No. 11/026,163 Office Action mailed Jul. 11, 2005.
U.S. Appl. No. 11/054,031 Office Action mailed Jan. 4, 2007.
U.S. Appl. No. 11/855,370 Final Office Action mailed Aug. 22, 2008.
U.S. Appl. No. 11/855,370 Office Action mailed Feb. 22, 2008.
U.S. Appl. No. 11/282,848 Office Action mailed Jul. 9, 2008.
U.S. Appl. No. 11/282,848 Final Office Action mailed Apr. 9, 2008.
U.S. Appl. No. 11/282,848 Office Action mailed Dec. 7, 2007.
U.S. Appl. No. 11/764,551 Office Action mailed Sep. 8, 2009.
U.S. Appl. No. 10/815,422 Office Action mailed Oct. 5, 2005.
U.S. Appl. No. 13/931,813 Office Action mailed Jun. 30, 2015.
U.S. Appl. No. 13/931,814 Office Action mailed Jun. 18, 2015.
U.S. Appl. No. 14/038,588, Kevin L. Van Pelt, Enclosure High Pressure Push-Pull Airflow, filed Jun. 26, 2013.
U.S. Appl. No. 13/931,781, Kevin L. Van Pelt, System for Cooling Multiple In-Line Central Processing Units in a Confined Enclosure, filed Jun. 28, 2013.
U.S. Appl. No. 13/931,813 Final Office Action mailed Dec. 16, 2015.
U.S. Appl. No. 15/215,009, Robert M. Kinstle, Server With Heat Pipe Coolin, filed Jul. 20, 2016.

* cited by examiner

HIERARCHICAL SYSTEM MANAGER ROLLBACK

BACKGROUND OF THE INVENTION

Field of the Invention

The present invention relates to data backup systems. In particular, the present invention relates to performing data rollbacks.

Description of the Related Art

As companies create more and more data, data storage systems reliability become more important. As technology improves, the data storage systems improve as well. Sometimes, the data storage systems transition between a first data format to a second data format. This creates challenges when a company's important data is stored in a first format or technology and the data storage company is transitioning to a second storage format.

When transitioning from a first format to a second format, it is very important to a data storage company to not lose any client information or data. To do so would risk the stability of a product, as well as risk the company's track record and reputation. Therefore, providing a safe and reliable means to transition from one data state to another is very important.

What is needed is an improved method for transitioning from one data state to another.

SUMMARY OF THE CLAIMED INVENTION

The present technology allows for data state rollover using snapshots and deltas. A series of snapshots is taken of the current data state, an original data state, and data states in between. Deltas are then generated between two sequential snapshots. This results in numerous deltas which represent the difference between consecutive snapshots. Once the deltas are acquired, the deltas may be stored along with the snapshot of the present data state. As such, previous data states may be rolled back to by determining the number of deltas to apply to the current data state to achieve the desired previous data state. In cases where the rollback or rollover fails, deltas may be played against the current data state to a point where the last known trusted and working data point existed.

An embodiment for performing a data state rollback beings with capturing a multitude of snapshots of workflow data from an original data state to a present data state. A series of deltas are created which represents the difference between each successive state. The deltas are wrapped between the current state and a desired state in a transaction framework to be replayed. The deltas and then played back to completion against the current snapshot.

DETAILED DESCRIPTION

Data state rollover is performed using snapshots and deltas. A series of snapshots is taken of the current data state, an original data state, and data states in between. Deltas are then generated between two sequential snapshots. This results in numerous deltas which represent the difference between consecutive snapshots. Once the deltas are acquired, the deltas may be stored along with the snapshot of the present data state. As such, previous data states may be rolled back to by determining the number of deltas to apply to the current data state to achieve the desired previous data state. In cases where the rollback or rollover fails, deltas may be played against the current data state to a point where the last known trusted and working data point existed.

Figure 1:
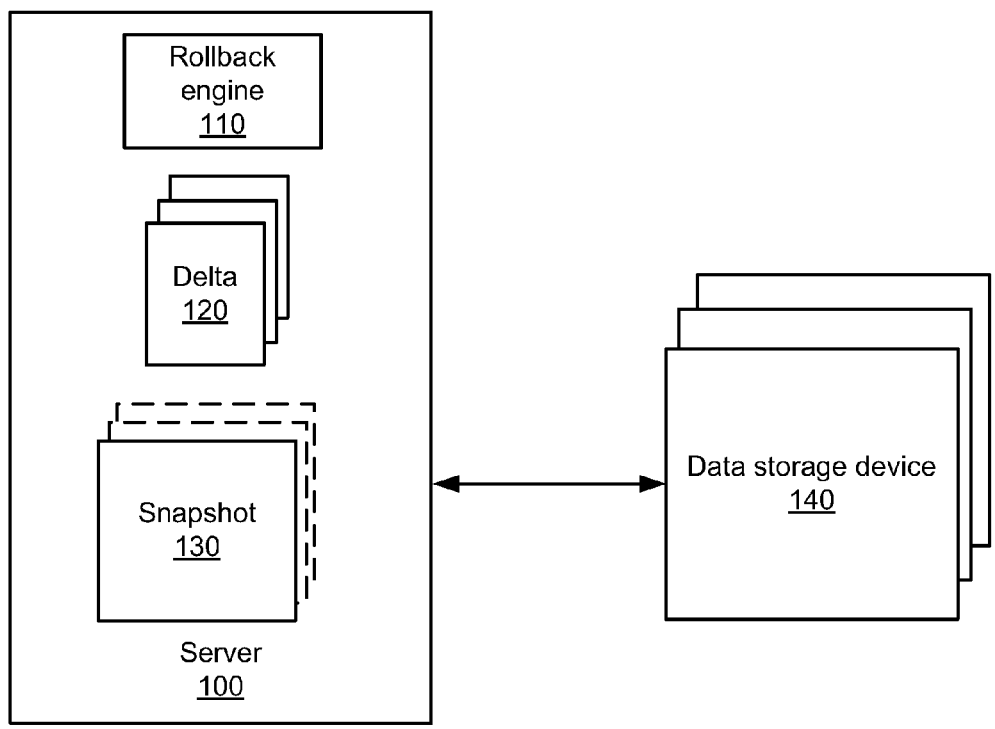
FIG. 1 is a block diagram of a system for performing rollback.

FIG. 1 is a block diagram of a system for performing rollback. The system of FIG. 1 includes server 100 and data storage device 140. Server 100 and data storage device 140 may communicate over a network, such as a private network, a public network, an intranet, the internet, or some other network or combination of networks.

Server 100 includes rollback engine 110, delta 120 and snapshot 130. Rollback engine 110 may include one or more modules that are stored in memory and executed by a processor to perform rollback operations. Rollback engine 110 may also be executed to collect rollback data. The rollback data may include delta data 120 and snapshot 130. Snapshots 130 may include snapshots of the current state of data, a snapshot of the original state of data and snapshots contained periodically in between. The snapshots may be obtained at policy driven intervals to ensure that enough data is collected to rollback to any particular state desired by a user. In some embodiments, snapshots may be acquired periodically, based on specific policies or volume of changed data, or based on other reasons. Delta 120 may represent a measure of the distance between successive snapshots. For example a first delta may be taken between the current snapshot and the most recent snapshot other than the current snapshot. Only the current snapshot is stored in server 100, as the base snapshot and deltas 120 are all that is needed in order to perform a rollback operation.

Figure 2:
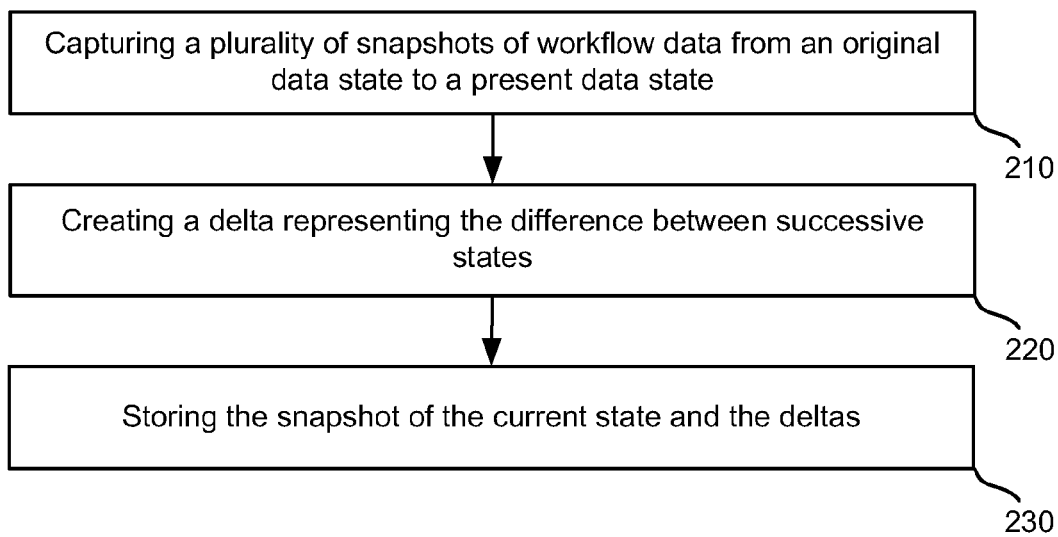
FIG. 2 is a method for storing rollback data.

FIG. 2 is a method for storing rollback data. The method of FIG. 2 begins with capturing a plurality of snapshots of workflow data from an original data state to a present data state at step 210. The snapshots may be taken periodically, based on specific policies or volume of changed data, or based on other active or passive events. In some embodiments, the two states of data may have different formats. For example, the original data may be in a NoSQL data store while the present data state is managed by a relational database management system (RDBMS) format of data.

Deltas may then be created representing the differences between the successive states at step 220. The deltas may be determined simply by taking the difference of two consecutive snapshots. The snapshot of the current period and the deltas are stored at step 230. The other snapshots are not needed as the other states can be determined based on the deltas and the current snapshot.

An embodiment may be used to rollback new data in a new state to old data in an old state. An original data state and format is formatted by a particular software program. The data may initially be converted to a new data state and format, and the later data states may be formatted differently by upgraded or changed software programs. The deltas may be taken in the new format and convert the new data, if a rollback is desired, into a neutral format. In some embodiments, the deltas may be generated in the neutral data format representing the difference between each successive state. The deltas can then be wrapped between the current state and the desired state in a transaction framework to be replayed. This allows for replay of the deltas against the original data state and format as well, and the original software can access the data, regardless of which state the data is originally formatted in. An application written to use the original format may still be used to access the data. The application may be able to pickup from the current data state, but in the old data format.

Figure 3:
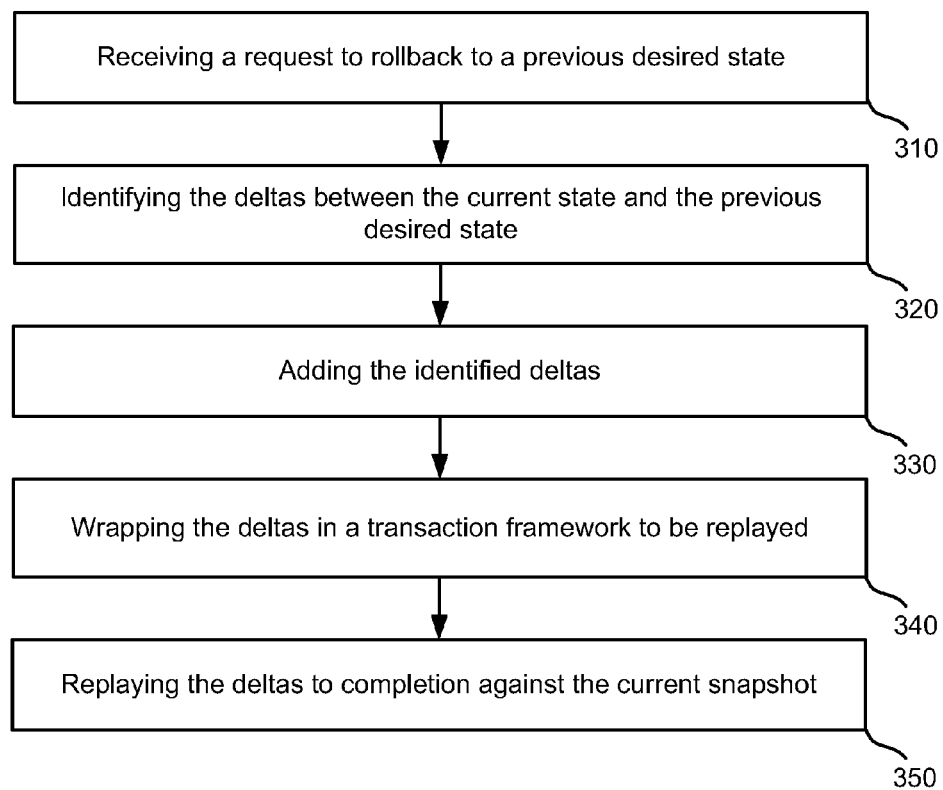
FIG. 3 is a method for performing rollback.

FIG. 3 is a method for performing rollback. First, a request to rollback to a previous desired state is received at step 310. In some embodiments, the request may be received from a user. The deltas between the current state and the previous desired state are identified at step 310. In some embodiments, the deltas may be time stamped to identify their approximate association in time. Identified deltas may be added at step 330. The deltas may be added up to one delta in some embodiments. The deltas may be wrapped up in a transaction framework to be replayed at step 340. The deltas are replayed to completion against the current snapshot at step 350. In some embodiments, a single delta is played against a current snapshot at step 350.

Figure 4:
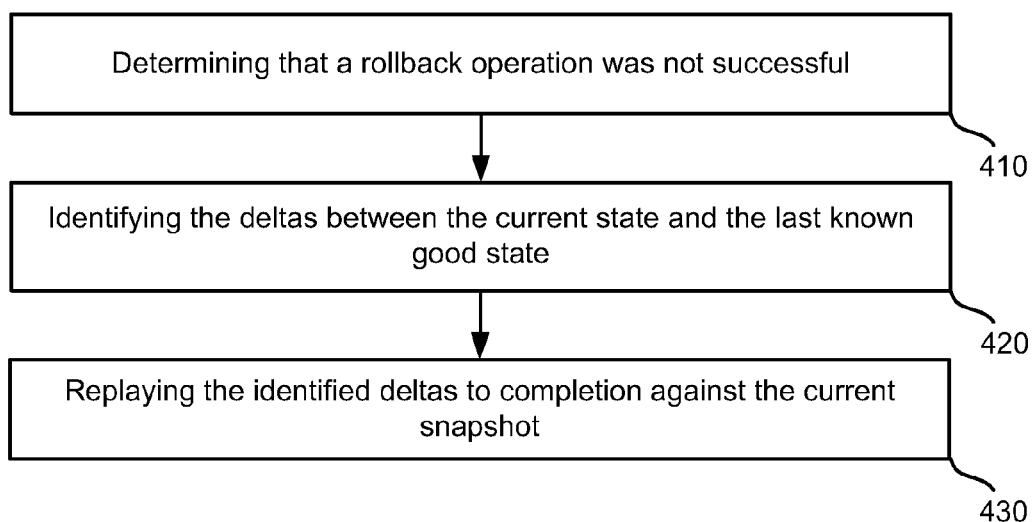
FIG. 4 is a method for processing a failed rollback.

FIG. 4 is a method for processing a failed rollback. The method of FIG. 4 begins with determining that a rollback operation was not successful at step 410. The deltas between the current state and the last known good state are identified at step 420. The identified deltas are then replayed to completion against a current snapshot at step 430.

Figure 5:
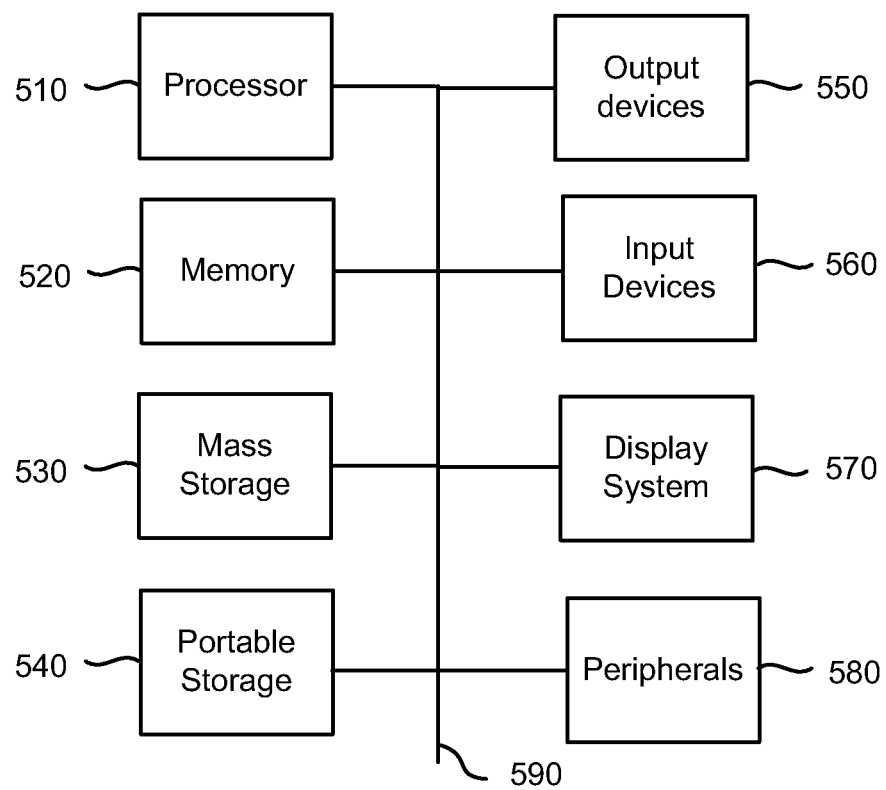
FIG. 5 is a block diagram of a computing system for implementing a server.

FIG. 5 is a block diagram of a computing system for implementing a server 100. The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for performing a data state rollback, the method comprising a processor executing instructions out of a memory to:
    capture a plurality of snapshots of workflow data from an original data state, wherein each snapshot of the plurality of snapshots are captured based on a volume of changed data since a previous snapshot was captured according to a policy that identifies that a subsequent snapshot should be taken according to the policy, and the workflow data from the original data state is formatted according to a data format associated with a non-relational database;
    convert the workflow data into a present data state, wherein the present data state is formatted according to a data format associated with a relational database;
    creating create one or more deltas representing the difference between each successive state;
    wrapping the deltas between a current state and a desired state in a transaction framework to be replayed; and
    replaying replay the deltas to completion against the current snapshot, wherein the replaying of the deltas performs a rollback operation that rollbacks the workflow data to a previous desired state.

2. The method of claim 1, wherein the original data state included non-SOL (NoSQL) data and the present data state includes relational database management system (RDBMS) data.

3. The method of claim 1, wherein the processor executing instructions out of the memory identifies the deltas between the current state and the previous desired state.

4. The method of claim 3, wherein the processor executing instructions out of the memory sums the identified deltas.

5. The method of claim 1, wherein the processor also receives a request to rollback to the previous desired state.

6. The method of claim 1, wherein the processor stores the snapshot of the current state and a delta in the memory, wherein the delta includes information that identifies changes in the workflow data from a previous state to the current state.

7. The method of claim 1, wherein the processor executing instructions out of the memory: further comprising:
identifies that the rollback operation was not successful; and
rolls back to a last good recovery point after identifying that the rollback operation was not successful.

8. A non-transitory computer readable storage medium having embodied thereon a program, the program being executable by a processor to perform a method for performing a data state rollback, the method comprising:
capturing a plurality of snapshots of workflow data from an original data state, wherein each snapshot of the plurality of snapshots are captured based on a volume of changed data since a previous snapshot was captured according to a policy that identifies that a subsequent snapshot should be taken according to the policy, and the workflow data from the original data state is formatted according to a data format associated with a non-relational database;
converting the workflow data into a present data state, wherein the present data state is formatted according to a data format associated with a relational database;
creating deltas representing the difference between each successive state;
wrapping the deltas between a current state and a desired state in a transaction framework to be replayed; and
replaying the deltas to completion against the current snapshot, wherein the replaying of the deltas performs a rollback operation that rollbacks the workflow data to a previous desired state.

9. The computer readable non-transitory computer readable storage medium of claim 8, wherein the original data state included non-SQL (NoSQL) data and the present data state includes relational database management system (RDBMS) data.

10. The non-transitory computer readable storage medium of claim 8, the program is further executable to identify the deltas between the current state and the previous desired state.

11. The non-transitory computer readable storage medium of claim 10, the program is further executable to sum the identified deltas.

12. The non-transitory computer readable storage medium of claim 8, the program is further executable to receive a request to rollback to the previous desired state.

13. The non-transitory computer readable storage medium of claim 8, the program further executable to store the snapshot of the current state and a delta, wherein the delta includes information that identifies changes in the workflow data from a previous state to the current state.

14. The computer readable non-transitory computer readable storage medium of claim 8, the program further executable to:
identify that the rollback operation was not successful; and
roll back to a last good recovery point after identifying that the rollback operation was not successful.

15. An apparatus for performing a data state rollback, the apparatus comprising:
a memory; and
a processor, wherein the processor executing instructions out of the memory:
captures a plurality of snapshots of workflow data from an original data state, wherein each snapshot of the plurality of snapshots are captured based on a volume of changed data since a previous snapshot was captured according to a policy that identifies that a subsequent snapshot should be taken according to the policy, and the workflow data from the original data state is formatted according to a data format associated with a non-relational database;
converts the workflow data into a present data state, wherein the present data state is formatted according to a data format associated with a relational database;
creates one or more deltas representing the difference between each successive state;
wrapping the deltas between a current state and a desired state in a transaction framework to be replayed; and
replays the deltas to completion against the current snapshot, wherein the replaying of the deltas performs a rollback operation that rollbacks the workflow data to a previous desired state.

16. The apparatus of claim 15, wherein the original data state included non-SOL (NoSQL) data and the present data state includes relational database management system (RDBMS) data.

17. The apparatus of claim 15, wherein the deltas between the current state and the previous desired state are identified.

18. The apparatus of claim 17, wherein the processor executing instructions out of the memory also sums the identified deltas.

19. The apparatus of claim 15, wherein the processor receives a request to rollback to the previous desired state.

20. The apparatus of claim 15, wherein the snapshot of the current state and a delta are store in the memory, and the delta includes information that identifies changes in the workflow data from a previous state to the current state.

* * * * *